United States Patent Office 3,450,642
Patented June 17, 1969

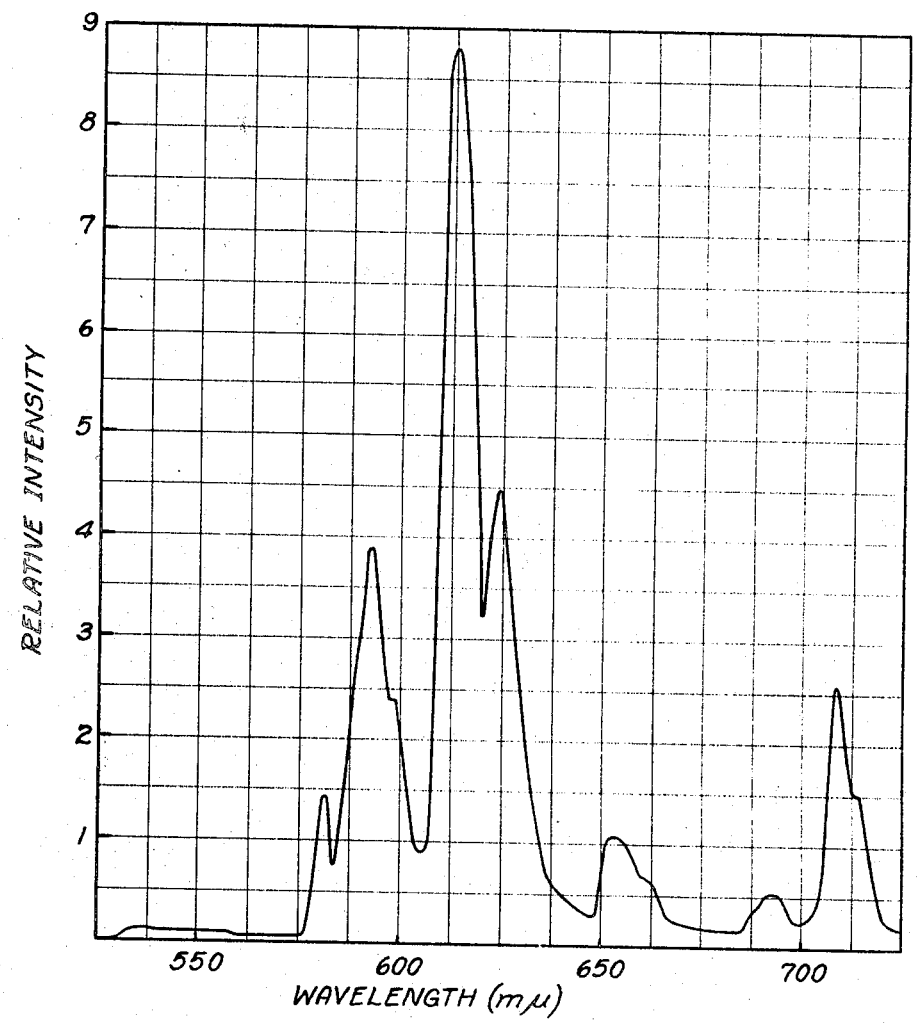

3,450,642
STRONTIUM YTTRATE LUMINESCENT
MATERIALS
Mary V. Hoffman, South Euclid, Ohio, assignor to General Electric Company, a corporation of New York
Continuation-in-part of application Ser. No. 468,810, July 1, 1965. This application Feb. 6, 1967, Ser. No. 628,189
Int. Cl. C09k 1/10
U.S. Cl. 252—301.4 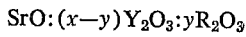 3 Claims

ABSTRACT OF THE DISCLOSURE

Strontium yttrate activated with the rare earths, dysprosium, samarium, terbium, or preferably europium, forms phosphors with emissions characteristic of the rare earth used and are useful in lamps and color television.

CROSS-REFERENCES TO RELATED APPLICATIONS

This application is a continuation-in-part of copending application Ser. No. 468,810, Mary V. Hoffman, filed July 1, 1965, now abandoned.

BACKGROUND OF THE INVENTION

The present invention relates to luminescent materials. More particularly, it relates to strontium yttrate phosphors useful in discharge lamps and cathode-ray tubes.

Improvements and particular characteristics have long been sought in red emitting phosphors, both for use in improving the whiteness and color rendition of the light output of high pressure mercury vapor lamps and for use in cathode-ray tubes such as for color television.

Phosphors of manganese-activated magnesium fluorogermanate, of tin-activated strontium magnesium orthophosphate have been used for adding a red component to the light output of high pressure mercury vapor lamps, thus improving the color of the light emitted and giving better color rendition.

SUMMARY OF THE INVENTION

It is an object of the present invention to provide improved red-emitting phosphors suitable for use in the color correction of high pressure mercury vapor discharge lamps, or for use in fluorescent lamps or cathode-ray tube applications.

Further objects and advantages of the invention will appear from the following detailed description of species thereof and from the accompanying drawing.

Briefly stated, according to one aspect of the present invention, I have discovered new and improved phosphor compositions of strontium yttrate activated with certain rare earths and, more specifically, compositions having the following molar composition:

$$SrO:(x-y)Y_2O_3:yR_2O_3$$

wherein:

R is at least one of the group consisting of Eu, Dy, Sm and Tb,
$x$ is between about 1.00 and 1.25,
$y$ is between 0.03 and 0.14,
$In_2O_3$ may be substituted for $Y_2O_3$ in amounts up to 10 mole percent,
MgO may be substituted for SrO in amounts of up to 10 mole percent, and
BaO may be substituted for SrO in amounts up to 25 mole percent.

The preferred ratio of $(R_2O_3+Y_2O_3):SrO$ is about 1.05. This avoids the possible presence of deleteriously hydroscopic SrO while staying sufficiently close to stoichiometry. The preferred concentration of the activator is about 0.05 mole $R_2O_3$ per mole of $Y_2O_3$.

BRIEF DESCRIPTION OF THE DRAWING

The single figure of the drawing is a spectral distribution curve for $SrY_2O_4:0.04Eu_2O_3$ showing the wavelength on the abscissa and relative intensity on the ordinate.

DETAILED DESCRIPTION OF THE PREFERRED EMBODIMENTS

Composition

In studies leading to the present invention, the

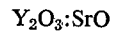

$$Y_2O_3:SrO$$

mole ratio in the $SrY_2O_4:Eu$ phosphor was varied between 0.85 and 1.30 $Y_2O_3$ per SrO. Brightness readings for the following ratios, with the standard composition as 100%.

| Ratio, $Y_2O_3$/SrO: | Brightness (percent) |
|---|---|
| .85 | 88.5 |
| .95 | 93.5 |
| 1.00 | 97 |
| 1.05 | 100 |
| 1.15 | 101 |
| 1.30 | 93.5 |

The samples with a high ratio will contain $(YEu)_2O_3$ as a second phase, which is also an efficient phosphor under 2,537 A. excitation. Samples with a ratio less than 1.0 will contain SrO as a second phase. This material would not contribute to the fluorescence, but is deleterious because it is hydroscopic. If present in the phosphor, it will possibly cause problems in suspension preparation or in lamp stability. The compound $SrY_2O_4$ is found only at the ratio 1.0, but in order to avoid the possible presence of SrO, the ratio of 1.05 $(YEu)_2O_3:1SrO$ has been used as the standard, and is the preferred composition.

The variation of brightness with $Eu_2O_3$ content has been determined and is shown in the following table wherein $y$ is in accordance with the formula:

$$SrO:(x-y)Y_2O_3:yR_2O_3$$

and $x$ is about 1.05.

| Value of $y$: | Brightness (percent) |
|---|---|
| 0.0025 | 25 |
| 0.0050 | 40 |
| 0.010 | 54 |
| 0.020 | 69 |
| 0.04 | 95 |
| 0.05 | 100 |
| 0.075 | 100 |
| 0.10 | 100 |
| 0.15 | 88 |
| 0.20 | 61 |
| 0.30 | 16 |

From these data, 5 mole percent $Eu_2O_3$ has been chosen as the preferred composition.

As with many phosphor reactions, the formation of  $SrY_2O_4$ is improved by the use of a fluxing agent. Fluorides and chlorides are commonly used and, in this case, it was found that the use of 5 mole percent $SrF_2$ was sufficient to give good brightnesses in reasonable firing times. Amounts at least as high as 10% of both fluorides and chlorides were used with no further advantage.

The above studies have lead to the following standard phosphor batch formulation which gives a good brightness with reasonable firing conditions.

Mole ratio:

0.95 SrO
0.05 SrF$_2$
1.00 Y$_2$O$_3$
.05 Eu$_2$O$_3$

For 1,000-gram batches to make SrY$_2$O$_4$:Eu, this corresponds to:

282.7 gm. SrO
18.0 gm. SrF$_2$
648.7 gm. Y$_2$O$_3$
50.56 gm. Eu$_2$O$_3$

Other activators would be used in proportional molar quantities and in the same manner.

Composition variations have been tried to determine if substitutions can be made in this formula. Substitutions of 5 to 50 mole percent of Zn, Ca, Ba and Mg for Sr, and La and In for Y were made in the SrY$_2$O$_4$:Eu phosphor. Of these, Mg, Ba and In are possible substituents. Some substitutions of Ba for Sr are possible in this matrix with no substantial change in brightness. However, when large amount of Ba are present, the phosphor will react with many of the commercially-used binders and cause instability of the phosphor suspension when held for reasonable lengths of time. With increasing Ba content, the suspension instability occurs more quickly, so that an exact figure of how much Ba can be tolerated depends on the application conditions. However, more than about 25 mole percent BaO is undesirable. For application in fluorescent lamps or high pressure mercury vapor lamps, normally coated from binder suspensions, it is preferred to have no Ba present.

Substitutions of up to 10 mol percent of MgO for SrO are possible with no decrease in brightness.

Substitutions of In$_2$O$_3$ for Y$_2$O$_3$ are possible up to 5 mole percent with no decrease in brightness and with an increase in the whiteness of the body color. Higher substitutions will gradually lower the brightness, but the advantages of the invention are still present with up to at least about 10 mole percent In$_2$O$_3$. Smaller additions (1%) were made with Er, Gd, Sb, and Bi, which were all definitely harmful to the phosphor brightness. As substitutes for Eu, Dy, Sm and Tb have also been found to give fluorescence.

Manufacturing procedure

The starting materials for these phosphors are SrCO$_3$, SrF$_2$ and Y$_2$O$_3$ which contain 5 mole percent Eu$_2$O$_3$. This is obtained by dissolving Y$_2$O$_3$ and Eu$_2$O$_3$ in dilute nitric acid, co-precipitating these as the oxalate and then firing to form (Y$_{0.95}$Eu$_{0.05}$)$_2$O$_3$. This can then be mixed with the carbonate and the fluoride by conventional means, such as ball milling, with assurance that the activator is thoroughly distributed in the composition. If the two oxides are used separately, it is difficult to obtain uniform material.

Phosphors have been fired at temperatures between 1,000° C. and 1,350° C. for from 2 to 16 hours. The preferred firing schedule is 1,150° C. for 2.5 hours.

Optical and lamp data

The spectral distribution curve for SrY$_2$O$_4$:0.04Eu$_2$O$_3$ is shown in the drawing. The line emission is typical of Eu emission and has the major emission at 615 m$\mu$. The emission does not change with changes in europium content. This sharp red emission has an advantage in high pressure mercury vapor lamp use in adding intense red, and in combination with the mercury arc, the phosphor gives good rendition in the red. The phosphor brightness is maintained at temperatures over 350° C., so that use in high pressure mercury vapor lamps is possible.

In a lamp test SrY$_2$O$_4$:0.05Eu$_2$O$_3$ gave 54.6 lumens per watt, comparable to results with (SrMg)$_3$(PO$_4$)$_2$:Sn phosphors, but with better white and color rendition. It is also useful in low pressure fluorescent lamps and can be mixed with other phosphors, adding red emission.

What I claim as new and desire to secure by Letters Patent of the United States is:

1. Luminescent material consisting essentially of a compound having the molar composition:

$$SrO:(x-y)Y_2O_3:yR_2O_3$$

wherein:

R is at least one of the group consisting of Eu, Dy, Sm and Tb,
$x$ is between about 1.00 and 1.25,
$y$ is between 0.03 and 0.14,
BaO may be substituted in part for SrO in amounts up to 25 mole percent,
MgO may be substituted in part for SrO in amounts of up to 10 mole percent, and
In$_2$O$_3$ may be substituted in part for Y$_2$O$_3$ in amounts up to 10 mole percent.

2. Luminescent material consisting essentially of a compound having the molar composition:

$$SrO:(x-y)Y_2O_3:yEu_2O_3$$

wherein:

$x$ is between about 1.00 and 1.25, and
$y$ is between about 0.03 and 0.14.

3. Luminescent material consisting essentially of a compound having approximately the molar composition:

$$SrO:0.95Y_2O_3:0.05Eu_2O_3$$

References Cited

UNITED STATES PATENTS 3,328,620   6/1967   Rimbach _____ 252—301.4

FOREIGN PATENTS 1,347,458   11/1963   France.

OTHER REFERENCES

Kroger, Some Aspects of the Luminescence of Solids, 1948, pp. 291–292.

Borchardt, Efficiency of Eu$^{+3}$ Fluorescence in Oxygen-Dominated Host Lattices, Journal of Chemical Physics, vol. 42, No. 11, June 1, 1965, pp. 3743–3745.

TOBIAS E. LEVOW, *Primary Examiner.*

R. D. EDMONDS, *Assistant Examiner.*